(12) United States Patent
Bashir et al.

(10) Patent No.: US 9,028,913 B2
(45) Date of Patent: May 12, 2015

(54) METHOD FOR SURFACE TREATMENT OF TITANIUM DIOXIDE PIGMENT

(75) Inventors: Sami M. Bashir, Jeddah (SA); Fadi Mohammed Saeed Trabzuni, Jeddah (SA); Ahmed V. Yaser, Jeddah (SA)

(73) Assignee: The National Titanium Dioxide, Co. Ltd. (CRISTAL), Jeddah (SA)

( * ) Notice: Subject to any disclaimer, the term of this patent is extended or adjusted under 35 U.S.C. 154(b) by 1641 days.

(21) Appl. No.: 11/906,259

(22) Filed: Oct. 1, 2007

(65) Prior Publication Data

US 2009/0087556 A1    Apr. 2, 2009

(51) Int. Cl.
*C09C 1/36* (2006.01)

(52) U.S. Cl.
CPC ........... *C09C 1/3661* (2013.01); *C01P 2002/85* (2013.01); *C01P 2004/04* (2013.01); *C01P 2004/61* (2013.01); *C01P 2004/62* (2013.01)

(58) Field of Classification Search
CPC .................................................... C09C 1/3661
USPC .......................................... 427/215; 106/438
See application file for complete search history.

(56) References Cited

U.S. PATENT DOCUMENTS

| 4,405,376 | A | | 9/1983 | Matsunaga et al. |
| 5,165,995 | A | * | 11/1992 | Losoi ............................ 428/403 |
| 5,203,916 | A | * | 4/1993 | Green et al. ................... 106/438 |
| 5,554,216 | A | | 9/1996 | Baidins et al. |
| 5,792,250 | A | * | 8/1998 | Braun et al. ................... 106/459 |
| 5,908,498 | A | * | 6/1999 | Kauffman et al. ............ 106/437 |
| 5,976,237 | A | | 11/1999 | Halko et al. |
| 7,135,065 | B2 | | 11/2006 | Drews-Nicolai et al. |
| 2006/0034739 | A1 | * | 2/2006 | Drews-Nicolai et al. ......... 423/1 |

* cited by examiner

*Primary Examiner* — Tabatha Penny
(74) *Attorney, Agent, or Firm* — Kilyk & Bowersox, P.L.L.C.

(57) ABSTRACT

A method of preparing coated titanium dioxide particles is provided. The method can include forming an aqueous suspension of titanium dioxide particles having a pH of from about 5.0 to about 7.0; adding a zirconium oxide-forming solution to the suspension in an amount sufficient to decrease the pH of the suspension to about 4.0 or lower; forming a zirconium oxide coating on the titanium dioxide particles to form a suspension of coated particles; adding an aluminum oxide-forming solution to the suspension of coated particles in an amount sufficient to increase the pH of the suspension to about 9.0 or higher; and forming an aluminum oxide coating on the coated particles to form a product.

24 Claims, 2 Drawing Sheets

METHOD FOR SURFACE TREATMENT OF TITANIUM DIOXIDE PIGMENT

FIELD

The present teachings relate to methods for the preparation of titanium dioxide pigment.

BACKGROUND

Titanium dioxide ($TiO_2$) is a widely used white pigment popular for its brightness and high refractive index. Titanium dioxide provides whiteness and opacity to products such as paints, coatings, plastics, papers, inks, cosmetics, foods, and medicines.

Titanium dioxide is a photoactive material and $TiO_2$ particles with size range below 0.2 micron are capable of absorbing ultraviolet light. As a result, electrons can be energized, creating holes in the valence bands and excitons in the conduction bands. In pigment applications, it is important to reduce the photoactivity of titanium dioxide because it can induce undesired redox reactions that degrade paint or coating materials.

In pigment processing, titanium dioxide photoactivity can be reduced by surface treating or coating $TiO_2$ particles with inorganic and/or electron harvesting materials. These coating materials can prevent ultraviolet light from reaching the surface of the $TiO_2$ particles. Other materials that can be used are able to quickly harvest or stabilize the energized electrons in the conduction bands before they initiate a redox reaction. For example, oxides of different elements, such as silicon and zinc, as well as different organic chemicals, can be used for this purpose.

The surface treatment of $TiO_2$ particles with oxide coating is a major processing step in titanium dioxide pigment production. It is a delicate and complex process where reaction conditions such as pH, ionic concentration, and temperature, have to be carefully monitored and adjusted. This is essential to ensure formation of the coating oxide material and to achieve excellent pigment performance. On a manufacturing plant scale, the complexity of the surface treatment process is magnified.

Traditionally, monitoring the pH has been needed not only to ensure that the coating oxide is formed, but also in most cases, to determine the type of the oxide forming. Generally, in surface treatment processes, pH control is carried out using strong acids, such as HCl and $H_2SO_4$, and strong alkalis, such as NaOH. Adjusting and controlling the pH, particularly at plant production scale, is a non-trivial step that consumes a large amount of time and chemicals. The use of acids and alkalis also increases the ionic concentration in the aqueous suspension of $TiO_2$ particles. This can induce unfavorable steric effects in the suspension, causing particles to agglomerate or flocculate, and rendering the surface treatment process ineffective. In addition, a high ionic content can also affect subsequent pigment processing steps. For instance, the efficiency of washing and filtration steps can be affected by the extent of ionic content in the titanium dioxide suspension. The higher the ionic content, the more water is consumed and the more time is needed.

A need exists for a titanium dioxide surface treatment method that utilizes a low ionic content and/or eliminates the use of acids or alkalis to adjust the pH. The method should desirably have a shortened surface treatment process time and provide enhanced efficiency of subsequent washing and filtration steps. The method should also desirably result in effective coating of $TiO_2$ particles for use as a pigment.

SUMMARY

According to various embodiments, the present teachings provide a method for coating $TiO_2$ particles with zirconium oxide and aluminum oxide. The method can utilize zirconium oxide-forming and aluminum oxide-forming precursors to adjust and maintain the pH of a titanium dioxide aqueous suspension, without utilizing additional pH controlling materials. The method can be used to prepare titanium dioxide particles for use as a pigment.

According to various embodiments, a method for preparing titanium dioxide pigment can comprise forming an aqueous suspension of $TiO_2$ particles and then adding a water-soluble zirconium oxide-forming compound to the suspension in an amount such that the pH of the suspension decreases to about 4.0 or lower, to enable formation of a zirconium oxide coating on the $TiO_2$ particles. A water-soluble aluminum oxide-forming compound can then be added to the suspension in an amount such that the pH of the suspension increases to about 9.0 or higher, and an aluminum oxide coating is formed on the $TiO_2$ particles. According to various embodiments, the method can be free of adding any additional pH adjustment compounds, other than the water-soluble zirconium oxide-forming compound and the water-soluble aluminum oxide-forming compound.

According to various embodiments, the method for preparing titanium dioxide pigment can further comprise filtering the aqueous suspension to recover the coated $TiO_2$ particles, washing, and drying the recovered coated titanium dioxide particles. In some embodiments, the recovered $TiO_2$ particles can be ground and micronized to reach a specific particle size.

According to various embodiments, the present teachings describe a $TiO_2$ pigment prepared by a method that comprises forming an aqueous suspension of titanium dioxide particles, adding a water-soluble zirconium oxide-forming compound to the suspension in an amount such that the pH of the suspension decreases to about 4.0 or lower, forming a zirconium oxide coating on the $TiO_2$ particles, adding a water-soluble aluminum oxide-forming compound to the suspension in an amount such that the pH of the suspension increases to about 9.0 or higher, and forming an aluminum oxide coat on the $TiO_2$ particles. According to various embodiments, the titanium dioxide pigment can be prepared by a method that does not utilize any additional pH adjustment compounds, other than the water-soluble zirconium oxide-forming compound and the water-soluble aluminum oxide-forming compound. In various embodiments, the coated $TiO_2$ particles can be recovered by filtering the aqueous suspension and washing and drying the recovered coated titanium dioxide particles.

DETAILED DESCRIPTION

Figure 1A:
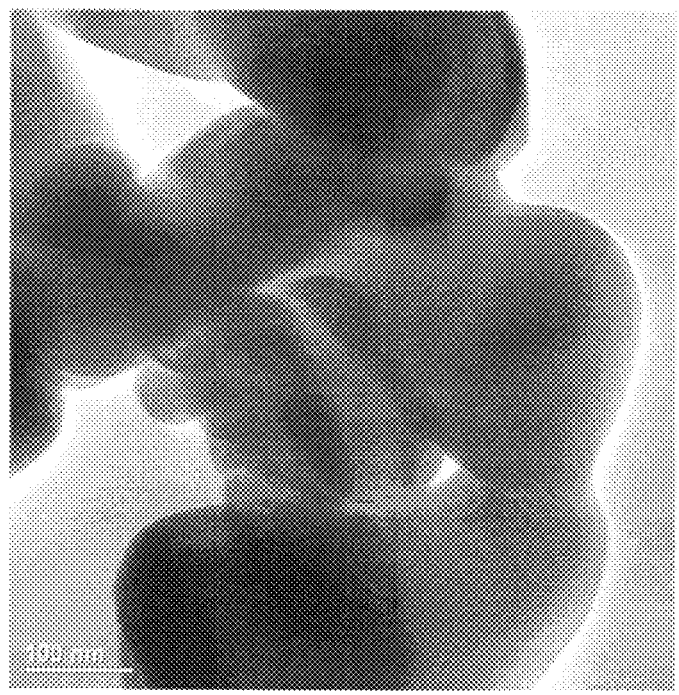
FIG. 1A shows a transmission electron microscopy (TEM) image of $TiO_2$ particles before surface treatment.

According to various embodiments of a method for preparing titanium dioxide pigment, $TiO_2$ particles can be coated with zirconium oxide and aluminum oxide. An aqueous suspension of $TiO_2$ particles can be prepared having a concentration range of from about 10% to about 50%, or from about 20% to about 40% (weight/volume, i.e, w/v). The overall density of the suspension can be less than about 1.5 g/ml at 25° C. In various embodiments, the $TiO_2$ particles can initially have an average particle diameter in a range of from about 0.001 microns to about 2.0 microns, or from about 0.01 microns to about 1.0 microns. The average particle size, for example, can be less than 0.5 microns, less than 0.25 microns, or about 0.2 microns.

In various embodiments, the titanium dioxide aqueous suspension can be heated to a temperature in the range of from about 60° C. to about 90° C. The initial pH of the titanium dioxide aqueous suspension can be in a range of from about 5.0 to about 7.0, for example, from about 5.5 to about 6.5, or about 6.0.

According to various embodiments, a water-soluble zirconium compound can then be added to the titanium dioxide aqueous suspension. The water-soluble zirconium oxide-forming compound can comprise, for example, a zirconium sulfate, such as zirconium ortho-sulfate. In some embodiments, the zirconium oxide-forming solution can comprise zirconium chloride, zirconium nitrate, zirconium acetate, zirconium carbonate, zirconium oxychloride, zirconium oxysulfate, and the like. The zirconium oxide-forming solution can have a zirconium ion content of, for example, not less than 10% (w/v). Upon addition of the zirconium oxide-forming solution, according to various embodiments, the pH of the titanium dioxide aqueous suspension can decrease to about 4.0 or lower, for example, to about 3.0 or lower. The decrease in pH can be attributed solely to the addition of the zirconium oxide-forming solution, according to various embodiments, without the addition of any other pH adjusting agents.

In various embodiments, a zirconium oxide coating can then be formed on the $TiO_2$ particles. The zirconium oxide coating can be allowed to form over a period of time, for example, at least about ten minutes, for example, for about 20 minutes or for about 30 minutes. The suspension can be continually heated and maintained at a temperature in the range of from about 60° C. to about 90° C. In some embodiments, the suspension can be continually stirred while the zirconium oxide coating is formed.

According to various embodiments, a water-soluble aluminum oxide-forming solution can then be added to the resulting zirconium oxide-coated titanium dioxide aqueous suspension. The water-soluble aluminum oxide-forming solution can comprise, for example, sodium aluminate. Other aluminum oxide-forming solutions that can be used can comprise other alkali aluminates, for example, potassium aluminate, tricalcium aluminate, and the like. Upon addition of the aluminum oxide-forming solution, in various embodiments, the pH of the aqueous suspension can increase to at least about 9.0 or greater, for example, to about 9.5 or greater, or to about 10.0. According to various embodiments, the pH increase can be attributed solely to the addition of the aluminum oxide-forming solution, without the addition of any other pH adjusting agents. In various embodiments, an aluminum oxide coating can then be formed on the zirconium oxide-coated $TiO_2$ particles. The aluminum oxide coating can be allowed to form over a period of time of at least about ten minutes, for example, about 20 minutes, or about 30 minutes. The titanium dioxide suspension can be continually heated and maintained at a temperature of from about 60° C. to about 90° C., or from about 70° C. to about 80° C. In some embodiments, the suspension can be continually stirred while the aluminum oxide coating is formed. In various embodiments, after the aluminum oxide coating is formed, the pH of the resulting suspension can then be brought to within the range of from about 6.0 to about 9.0, for example, in the range of from about 6.5 to about 8.0.

In various embodiments, the coated $TiO_2$ particles can be separated from the aqueous suspension by filtration. The coated $TiO_2$ particles can then be washed, for example, with distilled water, so that the final pH of the filtrate is from about 6.0 to about 7.0, or from about 6.0 to about 6.5. The filtered, coated $TiO_2$ particles can then be dried, ground, and micronised to achieve a specific particle size. The ability to avoid the addition of pH and adjusting agents in the method can result in the conservation of water and time.

The following examples are presented to further illustrate various embodiments of the present teachings.

Example 1

A 40% (w/v) aqueous suspension of $TiO_2$ particles having a specific gravity of 1.4 g/ml was prepared by dispersing 400 grams of $TiO_2$ in one liter of distilled water. The pH of the titanium dioxide suspension was adjusted to 6.0±1.0 and the temperature of the suspension was made to be about 60° C. or higher. Then, 13 ml of zirconium ortho-sulfate solution (density 1.12 g/ml) at a concentration not less than 10% (w/v) was added to the titanium dioxide aqueous suspension. The suspension was then left to heat for at least about ten minutes. After that, 37 ml of sodium aluminate solution (density 1.49 g/ml) at a concentration not less than 15% (w/v) was added directly to the titanium dioxide aqueous suspension, resulting in an increase of the pH to greater than 10.0. The final pH was then adjusted to less than 9.0, and the suspension was filtered, washed, dried, ground, and micronised to produce the pigment.

Example 2

The method of preparation was similar to that described in Example 1, except that only 7.5 mls of zirconium ortho-sulfate was added.

Example 3

The method of preparation was similar to that described in Example 1, except that the final pH of the suspension, after adding the sodium aluminate solution, was not adjusted and remained at about 10.0.

Example 4

In this example, the $TiO_2$ particles were coated with aluminum oxide only. Approximately 45 ml of sodium aluminate were directly added to an aqueous suspension of $TiO_2$ particles, at a pH of 6.0±1.0. Upon addition of the sodium aluminate, the pH of the aqueous suspension increased to above 10. The titanium dioxide suspension was then heated for 10 minutes at 90° C. before bringing the pH down to 6±2. The titanium dioxide suspension was then further heated for 10 minutes before filtration, drying, grinding, and micronisation of the coated particles.

Comparative Sample

For comparison with Examples 1 to 4, coated $TiO_2$ particles were prepared according to the method described by Green et al. (U.S. Pat. No. 5,203,916), herein incorporated in its entirety by reference.

Results

Figure 1B:
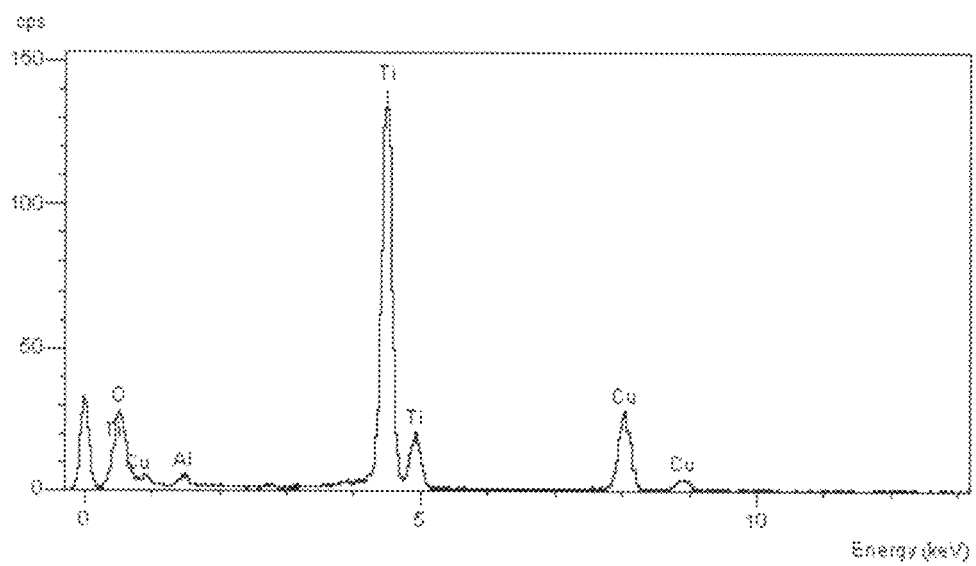
FIG. 1B shows the energy-dispersive x-ray spectroscopy (EDAX) elemental analysis of the $TiO_2$ particles shown in FIG. 1A.

FIG. 1A shows a TEM image of $TiO_2$ particles before surface treatment, according to various embodiments. No oxide coat can be observed on the surface of the particles. This is further confirmed by the EDAX elemental analysis, shown in FIG. 1B. The EDAX analysis shows that no zirconium peak can be detected.

Figure 2A:
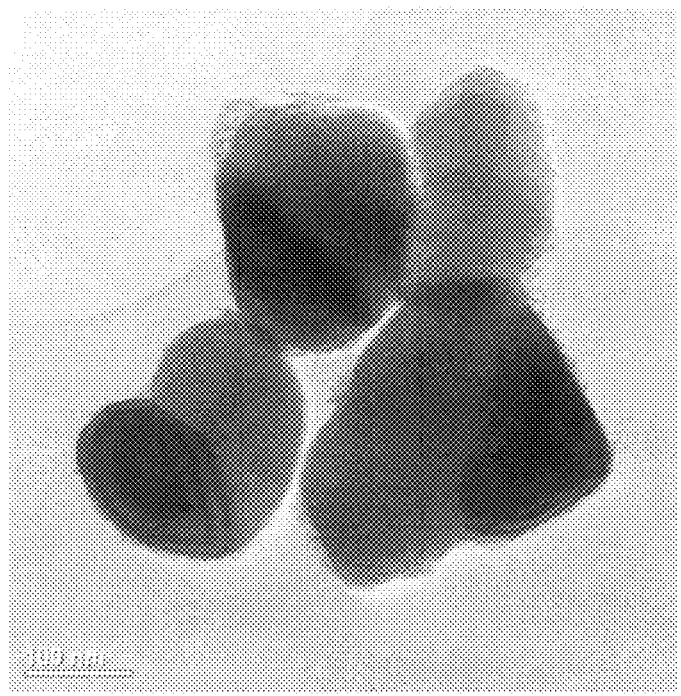
FIG. 2A shows a TEM image of $TiO_2$ particles coated with zirconium oxide and aluminum oxide according to an embodiment of the present teachings.
Figure 2B:
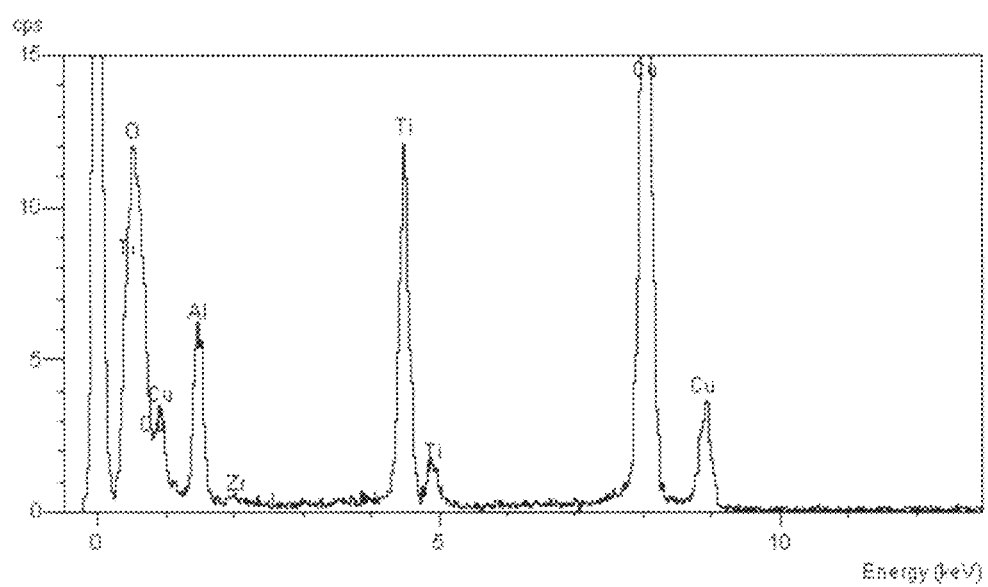
FIG. 2B shows the EDAX elemental analysis of the $TiO_2$ particles according to various embodiments and shown in FIG. 2A.

FIG. 2A shows a TEM image of $TiO_2$ particles after formation of the zirconium oxide and aluminum oxide coating, as prepared in Example 1. $TiO_2$ particles coated with zirconium oxide and aluminum oxide can be seen on the surface of the particles. This is confirmed by the EDAX elemental analysis shown in FIG. 2B, in which zirconium and aluminum peaks are present.

Table 1 shows the chemical composition of samples prepared according to Examples 1-4, and the Comparison Sample.

TABLE 1

Chemical Composition (by weight %) of coated $TiO_2$ Samples described in Examples 1-4

| Example 1 | $ZrO_2$ (%) | $Al_2O_3$ (%) | $TiO_2$ (%) |
|---|---|---|---|
| 1 | 0.48 | 3.70 | 95.82 |
| 2 | 0.23 | 3.60 | 96.17 |
| 3 | 0.50 | 3.80 | 95.70 |
| 4 | 0.00 | 3.60 | 96.40 |
| Comparison Sample | 0.46 | 3.56 | 95.98 |

Table 1 confirms the presence of coating oxides ($ZrO_2$ and $Al_2O_3$) in the prepared titanium dioxide pigment materials according to embodiments of the present teachings. The Comparison Sample, prepared according to the methods described by Green et al., used additional amounts of pH controlling materials (i.e., additional sulphuric acid and sodium hydroxide). As seen in Table 1, the chemical composition of Example 1 and Example 3 compare favorably to the Comparison Sample. Example 2, prepared similarly to Example 1 but with half the volume of zirconium orthosulfate, produced $TiO_2$ particles coated with about half the amount of zirconium oxide. Example 4, prepared without adding any zirconium compound, produced $TiO_2$ particles having no zirconium oxide coating. The aluminum oxide coating was unaffected.

As detailed in Table 1, Example 1 and Example 3 compare favorably to the Comparison Sample. The preparation of samples in Examples 1-4, however, was faster than the preparation of the Comparison Sample by at least 15%. This was at least partially due to the elimination of additional steps related to adjusting the pH of the titanium dioxide suspension with additional acids or alkalis, and with easier washing of the samples. For example, the preparation of Examples 1-4 used, at a minimum, at least about 18% less water for the filtrate washing. Furthermore, Examples 1-4 used at least about 25% less acid, and about 100% less alkali, compared to the preparation of the Comparison Sample.

The titanium dioxide pigments produced in Examples 1-4 were further examined to ensure their stability as pigments. For this, two tests were carried out. The first test evaluated the dispersion of samples in alkyd paint resin, as described by Roberts et al. (U.S. Pat. No. 6,544,328 B2), which is incorporated herein in its entirety by reference. The results of the dispersion tests are shown in Table 2.

TABLE 2

Dispersion of $TiO_2$ samples produced in Examples 1 to 4, in alkyd paint resin.

| Time After Sample Addition (min.) | Fineness of Grind At Different Time Intervals (μm) | | | |
|---|---|---|---|---|
| | Example 1 | Example 2 | Example 3 | Example 4 |
| 5 | 30 | 45 | 20 | 20 |
| 10 | 15 | 20 | 10 | 10 |
| 15 | 10 | 15 | 10 | 10 |
| 20 | 10 | 10 | 10 | 10 |

A second test measured the extent of durability of the samples as pigment, as described by Baidins et al. (U.S. Pat. No. 5,554,216), which is incorporated herein in its entirety by reference. The results of the durability rating are shown in Table 3.

TABLE 3

Durability rating of $TiO_2$ samples produced in Examples 1 to 4.

| Example | Durability rating from: 1-10* |
|---|---|
| 1 | 8.70 |
| 2 | 7.90 |
| 3 | 10.0 |
| 4 | 3.50 |

*1 is lowest and 10 is highest durability achieved.

While the present teachings have been described in terms of exemplary embodiments, it is to be understood that changes and modifications can be made that fall within the scope of the present teachings.

What is claimed is:

1. A method for preparing a coated titanium dioxide pigment, comprising:
   (a) forming an aqueous suspension of titanium dioxide particles having a pH of from about 5.0 to about 7.0;
   (b) adding an aluminum oxide-forming solution to the suspension of particles in an amount sufficient to increase the pH of the suspension to about 9.0 or higher, the aluminum oxide-forming solution comprising a water-soluble aluminum oxide-forming compound and water and being free of any additional pH-adjusting compounds other than the water-soluble aluminum oxide-forming compound; and
   (c) forming an aluminum oxide coating on the titanium dioxide particles;
   wherein the method is free of adding any additional pH-adjusting compounds other than the water-soluble aluminum oxide-forming compound.

2. The method of claim 1, wherein the aluminum oxide-forming solution comprises sodium aluminate.

3. The method of claim 1, consisting essentially of steps (a)-(c).

4. The method of claim 1, consisting of steps (a)-(c).

5. A method for preparing a coated titanium dioxide pigment, comprising:
   (a) forming an aqueous suspension of titanium dioxide particles having a pH of from about 5.0 to about 7.0;
   (b) adding a zirconium oxide-forming solution to the suspension in an amount sufficient to decrease the pH of the suspension to about 4.0 or lower, the zirconium oxide-forming solution comprising a water-soluble zirconium oxide-forming compound and water and being free of any additional pH-adjusting compounds other than the water-soluble zirconium oxide-forming compound;

(c) forming a zirconium oxide coating on the titanium dioxide particles to form a suspension of coated particles;

(d) adding an aluminum oxide-forming solution to the suspension of coated particles in an amount sufficient to increase the pH of the suspension to about 9.0 or higher, the aluminum oxide-forming solution comprising a water-soluble aluminum oxide-forming compound and water and being free of any additional pH-adjusting compounds other than the water-soluble aluminum oxide-forming compound; and (e) forming an aluminum oxide coating on the coated particles to form a product;

wherein the method is free of adding any additional pH-adjusting compounds other than the water-soluble zirconium oxide-forming compound and the water-soluble aluminum oxide-forming compound.

6. The method of claim 5, wherein the pH of the aqueous suspension of titanium dioxide particles before adding the zirconium oxide-forming solution in step (b) is from about 5.5 to about 6.5.

7. The method of claim 5, wherein the pH of the aqueous suspension of titanium dioxide particles before adding the water-soluble zirconium oxide-forming compound in step (b) is about 6.0.

8. The method of claim 5, wherein the amount of the zirconium oxide-forming solution added in step (b) is sufficient to cause the pH of the aqueous suspension of titanium dioxide particles after adding the water-soluble zirconium oxide-forming solution to be about 3.0 or lower.

9. The method of claim 5, wherein the pH of the aqueous suspension of titanium dioxide particles after adding the aluminum oxide-forming solution in step (d) is about 9.5 or higher.

10. The method of claim 5, wherein the titanium dioxide particles in step (a) have an average particle diameter in a range of from about 0.01 micron to about 1.0 micron.

11. The method of claim 5, wherein the titanium dioxide particles in step (a) have an average particle diameter of less than or equal to about 0.2 micron.

12. The method of claim 5, wherein the aqueous suspension of titanium dioxide particles has a concentration in a range of from about 10% to about 50%.

13. The method of claim 5, wherein the zirconium oxide-forming solution comprises a zirconium chloride.

14. The method of claim 5, wherein the zirconium oxide-forming solution comprises zirconium orthosulfate.

15. The method of claim 5, wherein the aluminum oxide-forming solution comprises sodium aluminate.

16. The method of claim 5, further comprising after step (e):

(f) filtering the aqueous suspension to recover the product; and (g) washing and drying the recovered product.

17. The method of claim 16, wherein the final pH of the washed product is about 6.0.

18. The method of claim 5, wherein the zirconium oxide coating is formed on the titanium dioxide particles in step (c) over a time period of at least 10 minutes.

19. The method of claim 5, wherein the aluminum oxide coating is formed on the coated titanium dioxide particles in step (e) over a time period of at least 10 minutes.

20. The method of claim 5, wherein the zirconium oxide-forming solution consists of zirconium ortho-sulphate and water.

21. The method of claim 5, wherein the zirconium oxide-forming solution consists of zirconium ortho-sulphate and water, and the aluminum oxide-forming solution comprises sodium aluminate.

22. A method for preparing a coated titanium dioxide pigment, consisting essentially of:

(a) forming an aqueous suspension of titanium dioxide particles having a pH of from about 5.0 to about 7.0;

(b) adding a zirconium oxide-forming solution to the suspension in an amount sufficient to decrease the pH of the suspension to about 4.0 or lower, the zirconium oxide-forming solution comprising a water-soluble zirconium oxide-forming compound and water and being free of any additional pH-adjusting compounds other than the water-soluble zirconium oxide-forming compound;

(c) forming a zirconium oxide coating on the titanium dioxide particles to form a suspension of coated particles;

(d) adding an aluminum oxide-forming solution to the suspension of coated particles in an amount sufficient to increase the pH of the suspension to about 9.0 or higher, the aluminum oxide-forming solution comprising a water-soluble aluminum oxide-forming compound and water and being free of any additional pH-adjusting compounds other than the water-soluble aluminum oxide-forming compound; and (e) forming an aluminum oxide coating on the coated particles to form a product;

wherein the method is free of adding any additional pH-adjusting compounds other than the water-soluble zirconium oxide-forming compound and the water-soluble aluminum oxide-forming compound.

23. The method of claim 22, wherein the zirconium oxide-forming solution comprises zirconium orthosulfate.

24. The method of claim 22, wherein the method consists of steps (a) through (e).

* * * * *